United States Patent
Edmond et al.

(10) Patent No.: US 8,985,533 B2
(45) Date of Patent: Mar. 24, 2015

(54) CLAMP BLOCK ASSEMBLY

(71) Applicant: Airbus Operations Limited, Bristol (GB)

(72) Inventors: George Edmond, Yatton (GB); Philip Dickinson, Shipham (GB); Nicholas Siangolis, North Somerset (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 13/770,855

(22) Filed: Feb. 19, 2013

(65) Prior Publication Data

US 2013/0214100 A1    Aug. 22, 2013

(30) Foreign Application Priority Data

Feb. 20, 2012   (GB) .................................. 1202883.3

(51) Int. Cl.
*F16L 3/22*     (2006.01)
*F16L 3/12*     (2006.01)
*F16L 3/227*    (2006.01)

(52) U.S. Cl.
CPC .............. *F16L 3/1222* (2013.01); *F16L 3/227* (2013.01)
USPC ........... 248/68.1; 248/73; 248/74.1; 248/74.3

(58) Field of Classification Search
USPC ........ 248/68.1, 73, 74.2, 74.3, 62, 89, 69, 70, 248/72, 74.1
See application file for complete search history.

(56) References Cited

U.S. PATENT DOCUMENTS

| | | | | |
|---|---|---|---|---|
| 2,318,859 A | * | 5/1943 | Huguelet | 248/68.1 |
| 2,361,943 A | | 11/1944 | Issoglio et al. | |
| 2,417,260 A | * | 3/1947 | Morehouse | 174/135 |
| 2,683,578 A | * | 7/1954 | Rainey | 248/68.1 |
| 3,332,650 A | * | 7/1967 | Judge | 248/74.5 |
| 3,848,839 A | * | 11/1974 | Tillman | 248/74.2 |
| 3,906,592 A | * | 9/1975 | Sakasegawa et al. | 248/68.1 |
| 4,429,497 A | * | 2/1984 | Dibernardi | 52/27 |
| 4,470,622 A | * | 9/1984 | Pate et al. | 285/419 |
| 4,490,888 A | * | 1/1985 | Levant | 24/20 R |
| 4,887,927 A | * | 12/1989 | Bond | 403/68 |
| 4,921,191 A | * | 5/1990 | Herschler et al. | 248/70 |
| 5,098,047 A | * | 3/1992 | Plumley | 248/68.1 |
| 5,122,409 A | | 6/1992 | Akutsu et al. | |
| 5,205,520 A | * | 4/1993 | Walker | 248/74.1 |
| 5,226,892 A | * | 7/1993 | Boswell | 604/180 |
| 5,281,042 A | * | 1/1994 | Belrose | 403/234 |
| 5,372,697 A | | 12/1994 | Akutsu et al. | |
| 5,742,982 A | * | 4/1998 | Dodd et al. | 24/16 R |

(Continued)

FOREIGN PATENT DOCUMENTS

| | | |
|---|---|---|
| EP | 2068063 A2 | 6/2009 |
| EP | 2068063 A3 | 6/2010 |

(Continued)

OTHER PUBLICATIONS

Search Report corresponding to GB 1202883.3 dated Jun. 18, 2012.

*Primary Examiner* — Nkeisha Smith
(74) *Attorney, Agent, or Firm* — Lowe Hauptman & Ham, LLP

(57) ABSTRACT

A clamp block assembly for securing hydraulic pipes, the clamp block assembly comprising one or more unitary clamp blocks of deformable material each having a through hole for receiving a respective pipe, and a clamp adapted to apply a predetermined load around the clamp block(s).

16 Claims, 4 Drawing Sheets

(56) References Cited

U.S. PATENT DOCUMENTS

| | | | |
|---|---|---|---|
| 6,308,921 B1* | 10/2001 | Borzucki | 248/68.1 |
| 6,561,466 B1* | 5/2003 | Myers et al. | 248/74.4 |
| 6,578,800 B2* | 6/2003 | Stefan | 248/52 |
| 6,595,473 B2* | 7/2003 | Aoki et al. | 248/74.4 |
| 6,717,055 B2* | 4/2004 | Kato | 174/72 A |
| 6,732,764 B2* | 5/2004 | Miyamoto et al. | 138/110 |
| 7,464,966 B2* | 12/2008 | Miyajima et al. | 285/124.3 |
| 7,770,848 B2* | 8/2010 | Johnson et al. | 248/65 |
| 7,806,374 B1* | 10/2010 | Ehmann et al. | 248/67.5 |
| 7,938,371 B2* | 5/2011 | Oga et al. | 248/74.4 |
| 8,013,248 B2* | 9/2011 | Sakata et al. | 174/68.1 |
| 8,074,945 B2* | 12/2011 | Schoenau et al. | 248/74.4 |
| 8,230,883 B2* | 7/2012 | Takeshita et al. | 137/899 |
| 8,246,583 B2* | 8/2012 | Bierman | 604/174 |
| 8,267,357 B2* | 9/2012 | Kataoka et al. | 248/68.1 |
| 8,439,317 B2* | 5/2013 | Sampson | 248/74.4 |
| 2001/0052564 A1* | 12/2001 | Karlinger | 248/74.1 |
| 2005/0029005 A1* | 2/2005 | Arai et al. | 174/72 A |
| 2010/0132979 A1* | 6/2010 | Chen | 174/135 |
| 2010/0148018 A1* | 6/2010 | Schoenau et al. | 248/74.4 |

FOREIGN PATENT DOCUMENTS

| | | |
|---|---|---|
| GB | 538730 A | 2/1941 |
| JP | 2-145379 A | 6/1990 |

* cited by examiner

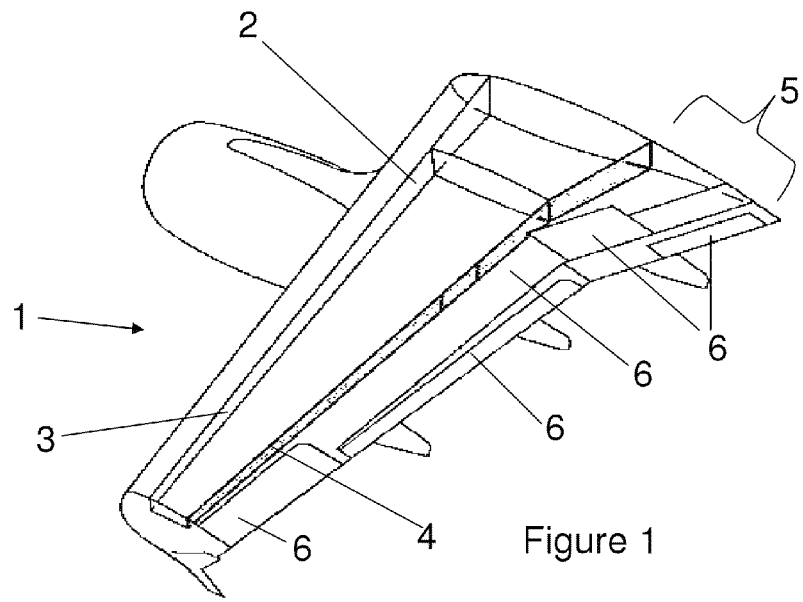
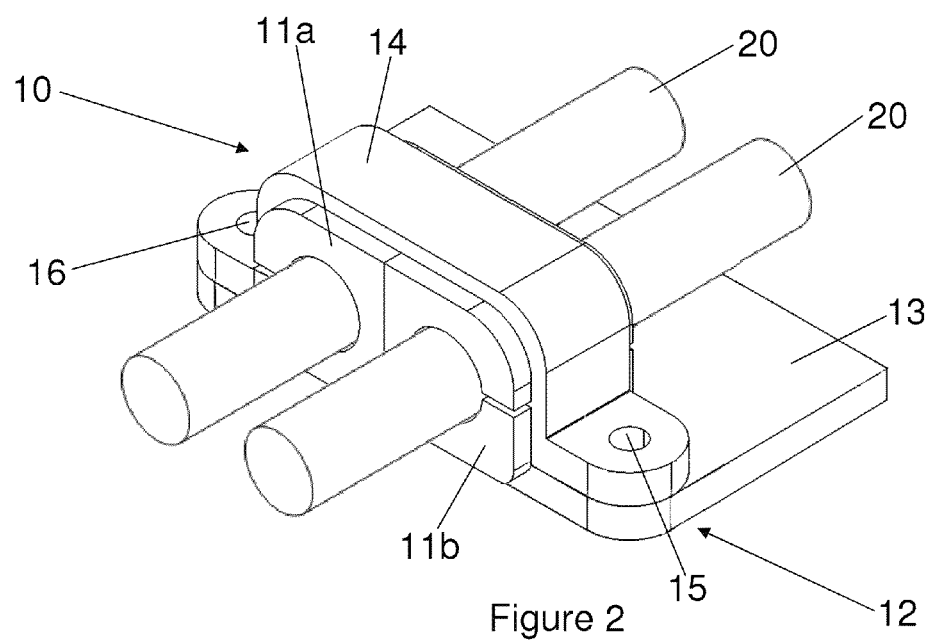

CLAMP BLOCK ASSEMBLY

RELATED APPLICATIONS

The present application is based on, and claims priority from, British Application Number 1202883.3, filed Feb. 20, 2012, the disclosure of which is hereby incorporated by reference herein in its entirety.

FIELD OF THE INVENTION

The present invention relates to a clamp block assembly for securing hydraulic pipes. In particular, though not exclusively, the clamp block assembly is used to secure hydraulic pipes in an aircraft. The clamp block assembly may alternatively be used to secure other pipe work, such as pneumatic pipes, in a variety of vehicular and non-vehicular applications.

BACKGROUND OF THE INVENTION

Aviation regulators, such as JAR (Joint Aviation Regulation), FAR (Federal Aviation Regulation) and EASA (European Aviation Safety Agency), specify requirements for fixed wing aircraft on the performance and reliability of the hydraulic systems that provide power to the aircraft's wing flight controls throughout the service life of the aircraft.

Hydraulic pipes run through various regions of the aircraft, e.g. along the aircraft wing trailing edge close to the rear structural spar. To help meet the performance and reliability requirements of the hydraulic systems, clamp block assemblies are used to hold, segregate and support the hydraulic pipes off the wing structure, without causing any localised damage to the hydraulic pipe surface in the clamping zone. The pipes are also required to be able to move axially through the clamp blocks due to thermal expansion and bending of the wing.

An existing clamp block assembly design solution comprises two opposing moulded plastic (nylon) blocks scalloped out to accept one or more hydraulic pipes—typically two or three pipes. Attaching and holding the two clamp blocks together are a pair of nut and bolt combinations.

Each nut and bolt combination includes a spacer tube around the bolt that sets the position of the bolt leaving a gap between the bolt head and the nearest nylon block. A spring washer acts against the bolt head and pushes the clamp blocks together. The intent is to allow the hydraulic system to be fitted without applying too much clamping force to the nylon blocks and inadvertently damaging the hydraulic pipes upon installation.

Holding the clamp block assembly in position is an attachment bracket which is also sandwiched within the clamped assembly of the existing solution.

The existing clamp block assembly design suffers the following disadvantages:

No tolerance to any variation in the pipe centre distances (i.e. the distance between the centres of any pair of pipes held within a clamp block), requiring a different clamp block design solution for each distance variation.
No tolerance of any variation in the pipe diameters requiring a different clamp block design solution for each size variation.
Does not promote commonality of parts through self adjustment.
Has high weight, primarily due to the material types.
Has high cost, due to the parts and high tolerance level.
Is sensitive to component tolerance variation.
Is complex and not intuitive to assemble, requiring a high skill set.

SUMMARY OF THE INVENTION

The invention provides a clamp block assembly for securing hydraulic pipes, the clamp block assembly comprising one or more unitary clamp blocks of deformable material each having a through hole for receiving a respective pipe, and a clamp adapted to apply a predetermined load around the clamp block(s).

The clamp preferably includes a first clamp part and a second clamp part adapted to be fastened to the first clamp part, preferably by bolting. The first and second clamp parts may have opposing bearing surfaces. Fastening the clamp parts together preferably brings the opposing bearing surfaces into contact such that the fasteners may have a simple construction. This contrasts with the complex spacer tube and spring washer arrangement of the prior solution.

One of the first and second clamp parts may be generally U-shaped, and the other of the first and second clamp parts may be generally planar. When the clamp parts are brought together they preferably sandwich the clamp block(s). The clamp parts may alternatively both take a generally U-shaped form.

The first and second clamp parts may have co-operating alignment features. These may assist with alignment of the clamp parts during assembly.

The clamp and the clamp block(s) may include co-operating key features to prevent relative movement therebetween. The co-operating key features may include tongue and groove features. The clamp block may include flanges on either side of the clamp.

The clamp block preferably includes a slit extending from the through hole to a peripheral edge of the clamp block. The clamp block material may be sufficiently deformable such that the slit opens up to permit the pipe to enter the hole from the edge of the block.

The clamp block material preferably includes one or more selected from the group comprising polymers, elastomers, and rubbers. The clamp block material preferably has a Shore hardness of approximately 55 to 65, most preferably approximately 60.

The through hole in the clamp block may be offset with respect to the block centreline. The block centreline is the geometric centre of the block parallel with the axis of the hole.

The clamp block is adapted to sit with respect to the clamp in a plurality of different orientations. With an offset hole, rotating the clamp block through its different orientations, during assembly, varies the location of the hole centre with respect to the clamp.

The clamp block assembly may include a plurality of the clamp blocks. Each clamp block assembly may typically includes two or three clamp blocks, although up to around 10 or 20 clamp blocks may be provided.

In the clamp block assembly at least two of the clamp blocks may be arranged touching back-to-back. Alternatively, at least two of the clamp blocks may be arranged back-to-back, and the clamp may further include a projection extending between the clamp blocks. The projection and the clamp blocks may include co-operating key features to prevent relative movement therebetween.

The clamp block assembly may further comprise a mounting bracket for attachment to an adjacent structure. The mounting bracket may be integrally formed with the clamp. For example, the mounting bracket may be formed as an extension of the planar clamp part.

The invention also provides an aircraft including one or more of the clamp block assemblies.

BRIEF DESCRIPTION OF THE DRAWINGS

Embodiments of the invention will now be described with reference to the accompanying drawings, in which:

FIG. 1 illustrates schematically an aircraft wing showing the location of the rear spar adjacent which various hydraulic lines are mounted;

FIG. 2 illustrates a clamp block assembly in accordance with a first embodiment of the invention, showing a portion of the hydraulic pipes in situ;

DETAILED DESCRIPTION OF EMBODIMENT(S)

Figure 3:
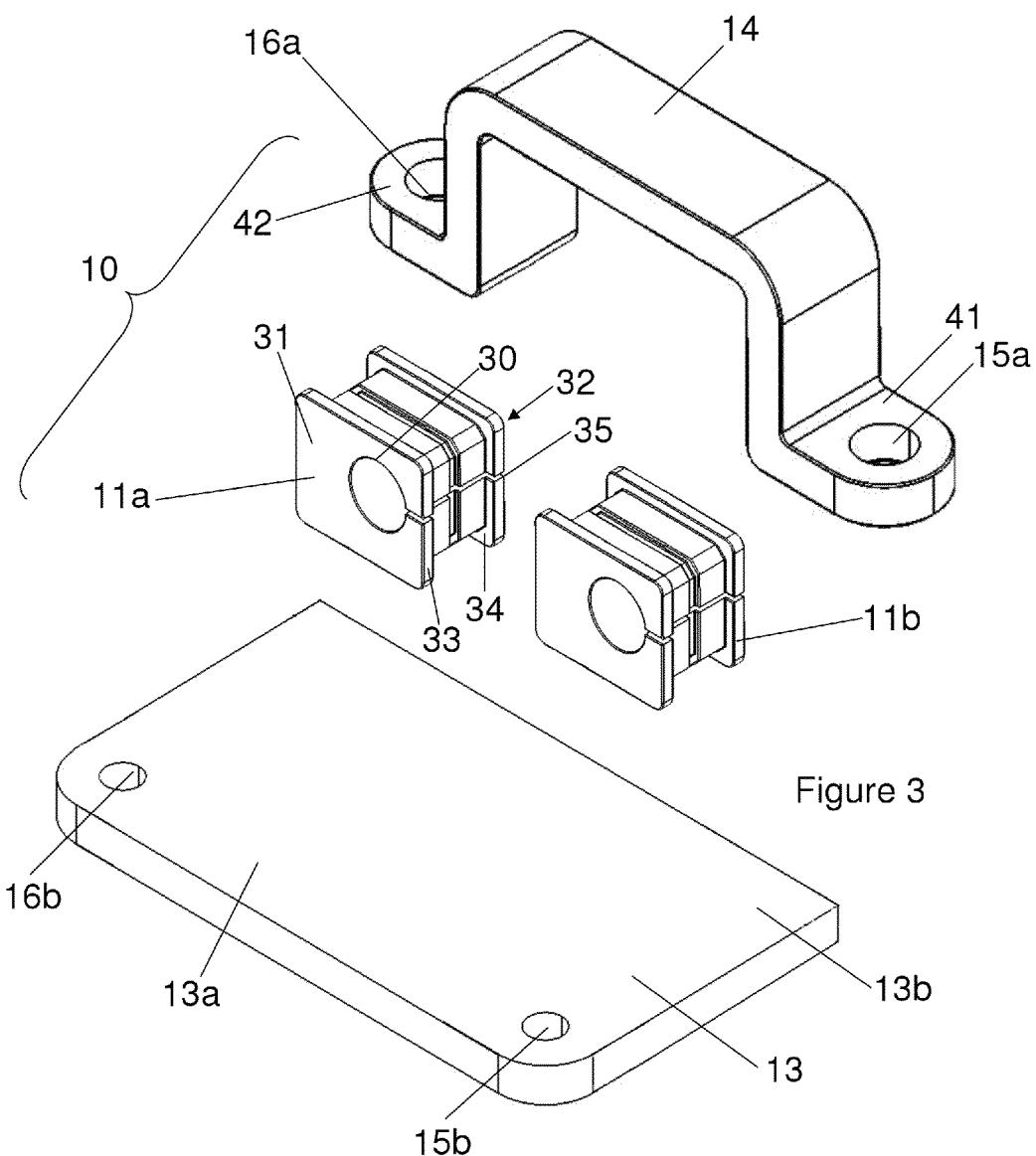
FIG. 3 illustrates an exploded view of the clamp block assembly, showing the two clamp block inserts, the lower clamp plate, and the upper clamp bracket.

FIG. 1 illustrates schematically an aircraft wing 1 having a torsion box, or "wing box" 2, of conventional type including a front spar 3 and a rear spar 4. The wing 1 has a trailing edge region 5 aft of the rear spar 4. The trailing edge includes a plurality of flight control surfaces 6, such as flaps, ailerons, spoilers, etc. of conventional type. The flight control surfaces 6 have associated actuators for moving the flight control surfaces between a variety of positions for controlling the aircraft.

In order to supply the hydraulic actuators with the necessary working fluid, e.g. hydraulic fluid known by its trade name Skydrol, or similar, a network of hydraulic pipes are typically arranged to run through the wing trailing edge region 5 adjacent the rear spar 4. To meet aviation regulations these hydraulic pipes are required to be separated and supported from the aircraft wing structure so as to ensure reliable performance of the aircraft hydraulic systems.

FIG. 2 illustrates a clamp block assembly 10 in accordance with a first embodiment of the invention used to secure hydraulic pipes 20. The clamp block assembly 10 comprises two discrete unitary clamp blocks 11a, 11b, of deformable material, and a clamp 12 comprising a bottom plate 13 and a saddle top cover 14 which is fastened to the bottom plate 13 at two fastener locations 15, 16, one on either side of the clamp blocks 11a, 11b. Each clamp block 11a, 11b has a through-hole which receives a respective one of the hydraulic pipes 20.

FIG. 3 illustrates an exploded view of the clamp block assembly 10 so as to show the constituent parts of the clamp block assembly 10 in greater detail. The clamp blocks 11a, 11b. Each clamp block is generally cuboid with a through-hole 30 extending between opposing end faces 31, 32 of the clamp block. The end faces project slightly beyond sides of the clamp block so as to define flanges 33, 34. A slit 35 extends from the through-hole 30 to one side of the clamp block and through the flanges 33, 34.

Each clamp block comprises deformable material, such as a relatively soft polymer, elastomer, or rubber. The clamp block material preferably has a Shore hardness of approximately 55 to 65, and preferably approximately 60. The clamp block material is sufficiently deformable that the slot 35 can be opened up in order that the hydraulic pipe 20 can be introduced into the through-hole 30 via the slot 35 through the side of the clamp block. The through-hole 30 has an internal diameter substantially corresponding to the external diameter of the hydraulic pipe 20.

The saddle top cover 14 is generally U-shaped with laterally extending flanges 41, 42 each having a respective through-hole 15a, 16a defining the fastener locations 15, 16. With the flanges, the saddle top cover has a "top-hat" profile. The saddle top cover 14 has a width substantially corresponding to the distance between the flanges 33, 34 of the clamp blocks 11a, 11b. The saddle top cover 14 is generally rigid and can be produced from a variety of different materials, including metals or plastics. For example, the saddle top cover may be cast or machined aluminium alloy or a moulded structural plastic such as polyamide, polyimide, polyester or PEEK.

The bottom plate 13 includes a pair of through-holes 15b, 16b defining the fastener locations 15, 16. The bottom plate 13 may be formed from a variety of different materials, such as steel, aluminium alloy or a structural plastic similar to that of the top cover 14. The bottom plate 13 comprises a first portion 13a, which, together with the saddle top cover 14, define a clamp of the clamp block assembly. The clamp is adapted to apply a predetermined load around the clamp blocks 11a, 11b when the two clamp parts 13, 14 are fastened together.

The bottom plate 13 further comprises a second portion 13b, which is optional. The optional second portion 13b forms part of an attachment bracket for holding and fixing the clamp block assembly 10 into position, e.g. on the fixed structure of the aircraft wing 1. In an alternative embodiment the second portion 13b is omitted and the clamp block assembly 10 is attached to a separate attachment bracket (not shown), e.g. via the fastener locations 15, 16 of the clamp.

The clamp block assembly 10 is assembled as follows. The clamp blocks 11a, 11b are each fitted around their respective hydraulic pipes 20 such that the hydraulic pipes become disposed in the through-holes 30 of the respective clamp blocks 11a, 11b. The bottom plate 13 is positioned on one side of the hydraulic pipes 20 and the saddle top cover 14 is brought on top of the clamp blocks 11a, 11b from the other side of the hydraulic pipes 20. The saddle top cover 14 fits in the groove between the flanges 33, 34 of the clamp blocks 11a, 11b and the fastener locations are aligned by aligning the through-holes 15a and 15b and the through-holes 16a, 16b of the clamp parts 13, 14. A respective fastener is then installed in each of the fastener locations 15, 16. Tightening the fasteners (not shown) applies a clamping force between the first and second clamp parts 13, 14. Opposing surfaces of the flanges 41, 42 of the saddle top cover 14 and of the first portion 13a of the bottom plate 13 adjacent the fastener locations 15, 16 define bearing surfaces which support the clamping loads applied by the fasteners.

The clamping blocks 11a, 11b are therefore sandwiched between the saddle top cover 14 and the bottom plate 13 and these components of the clamp block assembly 10 are appropriately sized such that the clamp 13, 14 applies a predetermined load around the clamp blocks 11a, 11b. Due to the deformable clamp block material this load slightly closes the slit 35 in the clamp blocks. This predetermined load is sufficient to securely hold the hydraulic pipes 20 with respect to the clamp block assembly 10 whilst ensuring that the hydraulic pipes 20 are only lightly loaded by this clamping force. It is important that the hydraulic pipes 20 are only lightly loaded such that thermal expansion of the pipe during use does not cause a crushing overload of the walls of the hydraulic pipes 20.

Figures 4A, 4B, 4C, 4D:
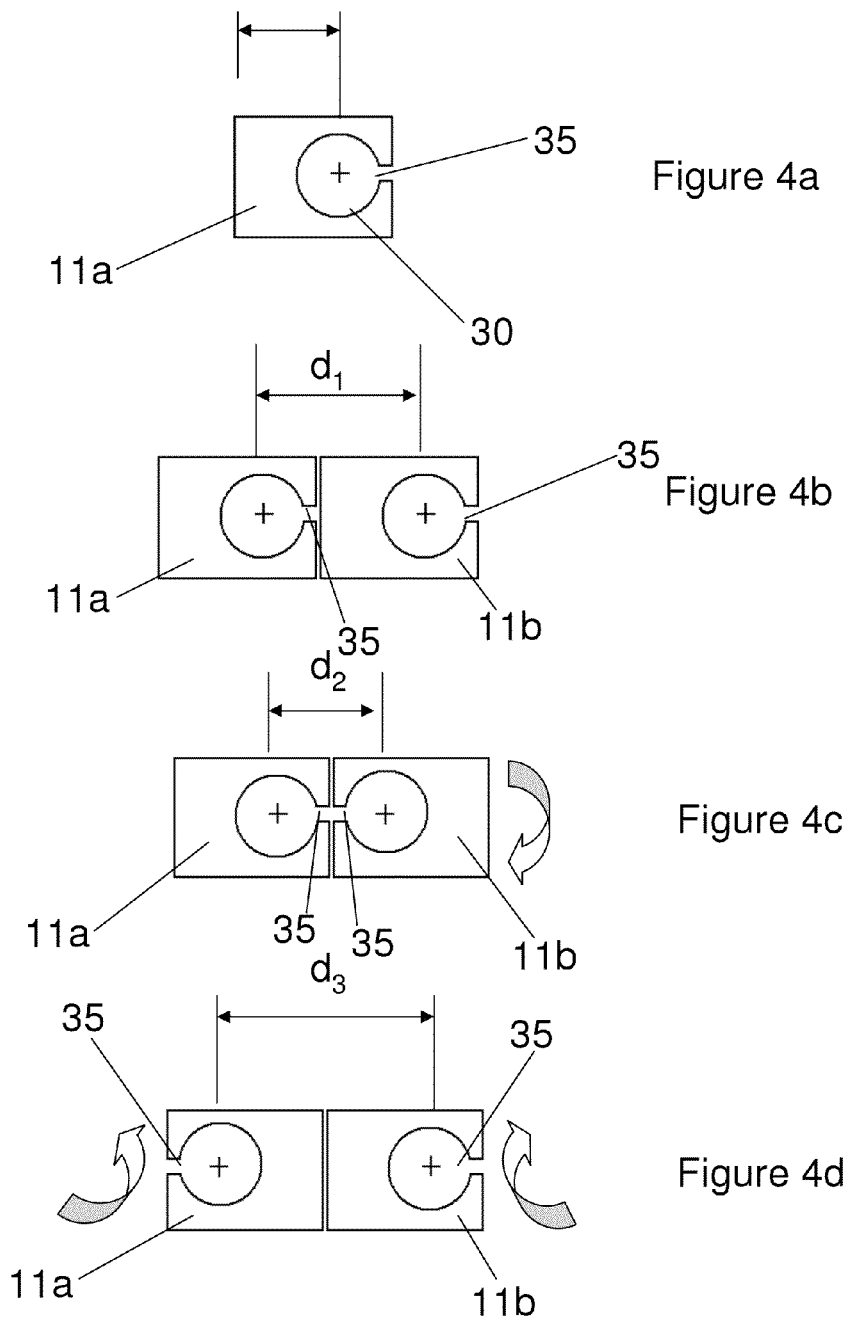
FIG. 4a illustrates a schematic view of the clamp block insert, showing the offset centre of the through hole.
FIGS. 4b, 4c and 4d illustrate how the clamp block insert of FIG. 4a can be arranged in pairs in different orientations to provide variation in pipe centre distances.

As shown schematically in FIG. 4a, the through-hole 30 of the clamp block 11 is deliberately offset from the centreline of the clamp block. That is to say, the longitudinal axis of the through-hole 30 is disposed nearer one side of the clamp block than to its opposite side. As shown in FIGS. 4b to 4d, this enables a pipe centre distance between two adjacent hydraulic pipes to be varied between three different distances.

In FIG. 4b, the two clamp blocks 11a, 11b are arranged with their slits 35 both extending in the same direction. This provides a first pipe centre distance $d_1$. Rotating the clamp block 11b through 180 degrees, such that the slits 35 of the clamp blocks are facing towards one another, sets up a second pipe centre distance $d_2$ which is less than $d_1$. In FIG. 4d both of the clamp blocks 11a, 11b have been rotated through 180 degrees with respect to the FIG. 4c arrangement such that the slits 35 are now facing away from one another, which sets up a third pipe centre distance $d_3$ which is greater than $d_1$. The offset through-hole in the clamp block is advantageous in that the same components may be arranged to provide clamp block assemblies having one of three different pipe centre distances in a two-block configuration.

It will be appreciated that the number of clamp blocks within the clamp block assembly is variable and may include any number of clamp blocks including one. Where the clamp block assembly includes three or more clamp blocks then the combinations of pipe centre distances between any pair of pipes to be supported will increase accordingly, providing excellent flexibility with minimal parts count.

Whilst in FIG. 3 the clamp blocks 11a, 11b are identical, it will be appreciated that this need not be the case. For example, a relatively small inventory of clamp blocks having different through-hole diameters each corresponding to a different pipe diameter may be used to swap out one or more of the clamp blocks. This provides great flexibility for supporting hydraulic pipes of different diameters whilst maximising use of common parts within each clamp block assembly.

The use of a deformable material for the clamp blocks promotes commonality through self adjustment and significantly reduces the tolerance level of the component parts of the clamp block assembly as compared with existing clamp block assembly solutions. This reduces the unit cost of each clamp block assembly.

The clamp block assembly 10 is intuitive to assemble and requires a relatively low level of skill to install the fasteners at the fastener locations 15, 16, without risk of overloading the clamping force exerted upon the hydraulic pipes. By reducing its complexity the clamp block assembly can be installed faster and without requiring a high skill set thereby significantly reducing the cost of installation. Furthermore, the reduced complexity of the clamp block assembly gives rise to significant weight savings as compared with the existing clamp block assembly solutions, primarily through a significant reduction in fastener size and by obviating the need for a spacer tube and spring washer to achieve a desired clamping preload. Given that any particular aircraft may have in excess of 200 clamp block assemblies this weight saving can lead to a significant reduction in aircraft weight and therefore reduce operating costs, fuel burn and emissions.

Figure 5:
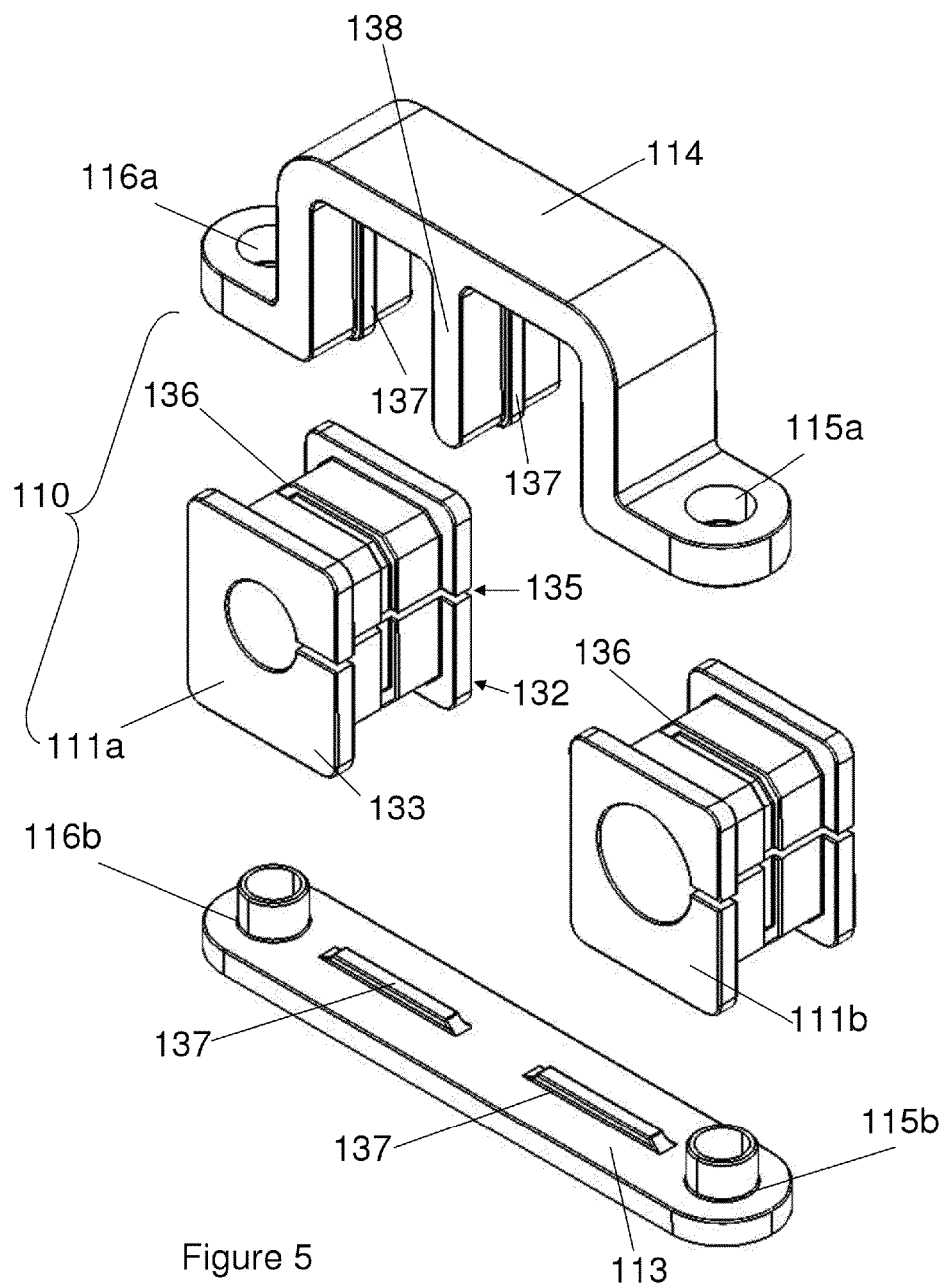
FIG. 5 illustrates an exploded view of a clamp block assembly in accordance with a second embodiment of the invention.

FIG. 5 illustrates an exploded view of a clamp block assembly 110 in accordance with a second embodiment of the invention. The clamp block assembly 110 shares many structural similarities with the clamp block assembly 10 described previously and so only the differences between them will be described in the following. In all other respects, the clamp block assembly 110 is the same as the clamp block assembly 10 described above.

Since the clamping blocks comprise a deformable material it is possible that some differential settlement can occur in the block. This could cause the through-hole in the clamp block to fall out of alignment with the centreline of the hydraulic pipe. This may lead to deterioration of the block material over time and/or force unwanted loads upon the hydraulic pipes. To overcome this the clamp 113, 114 of the clamp block assembly 110 may include cooperating key features to prevent relative movement between the clamp 113, 114 and the clamp blocks 11a, 11b.

The cooperating key features include tongue and groove features with a groove 136 extends around the four sides of the clamp block substantially equidistant from the end faces 131, 132, and traverses the slot 135. Tongue features 137 are formed in both the bottom plate 113 and the saddle top cover 114. These tongue and groove key features mate, hold and locate the clamp block assembly 110 together preventing unwanted assembly movement, both during assembly and throughout the clamp block assembly functional life.

As shown in FIG. 5, the saddle top cover 114 further includes an optional projection feature 138 such that the saddle top cover 114 forms a generally W-shaped configuration as opposed to the generally U-shaped configuration of the saddle top cover 14 described previously. The projection 138 also carries the tongue feature 137. The projection 138 extends between the clamp blocks 11a, 11b. The addition of the projection 138 together with the keyed tongue and groove features 136, 137 ensures that the tongue and groove features 136, 137 extend around substantially the entire periphery of the clamp blocks 111a, 111b.

The saddle top cover 114 has larger fastener holes 115a, 116a than in the first embodiment to receive locating turrets extending upwardly from around the respective fastener holes 115b, 16b of the bottom plate 113. These make alignment of the first and second parts of the clamp 113, 114 easier.

In the second embodiment the clamp blocks 111a, 111b have through holes of different diameters but this is optional, as discussed previously.

It will be appreciated that one or more features of the first and second embodiments may be incorporated in the other.

Where the clamp block assembly includes more than two clamp blocks, several of the projections depending from the saddle top cover may be provided. If there are many clamp blocks in the clamp block assembly then one or more additional fastener locations may be provided between the first and second parts of the clamp, e.g. between groups of the clamp blocks. In this case the saddle top cover may have an undulating profile.

The clamp block assembly may be used in both forward and retro-fit markets with only minor adaption. The assembly is designed to be simply removed and replaced using standard tools and fasteners.

Although the invention has been described above with reference to one or more preferred embodiments, it will be appreciated that various changes or modifications may be made without departing from the scope of the invention as defined in the appended claims.

The invention claimed is:

1. A clamp block assembly for securing hydraulic pipes, the clamp block assembly comprising a plurality of unitary clamp blocks of deformable material each having a plurality of sides, opposing end faces, and a through hole extending between said opposing end faces of a respective clamp block for receiving a respective pipe, and a clamp adapted to apply a predetermined load around the plurality of clamp blocks, wherein the clamp includes a first clamp part and a second clamp part adapted to be fastened to the first clamp part, and wherein the through hole in each clamp block is offset with respect to a centreline of the respective clamp block so that the through hole is nearer a first side of the plurality of sides of the clamp block than to a second side opposite the first side, wherein each of the plurality of clamp blocks is adapted to sit with respect to the clamp in a plurality of different orientations of rotation about the respective clamp block centreline, and wherein the clamp blocks each include flanges projecting from the end faces and extending beyond the sides of the respective clamp block.

2. A clamp block assembly according to claim 1, wherein the first clamp part and the second clamp part are adapted to be bolted together.

3. A clamp block assembly according to claim 1, wherein the first and second clamp parts have opposing bearing surfaces.

4. A clamp block assembly according to claim 1, wherein one of the first and second clamp parts is generally U-shaped, and the other of the first and second clamp parts is generally planar, such that when the clamp parts are brought together they sandwich the clamp block(s).

5. A clamp block assembly according to claim 1, wherein the first and second clamp parts have co-operating alignment features.

6. A clamp block assembly according to claim 1, wherein the clamp blocks each include a slit extending from the through hole to a peripheral edge of the respective clamp block.

7. A clamp block assembly according to claim 6, wherein the respective clamp block material is sufficiently deformable such that the slit opens up to permit the pipe respective to enter the through hole from the edge of the respective clamp block.

8. A clamp block assembly according to claim 1, wherein respective clamp block material includes one or more selected from the group comprising polymers, elastomers, and rubbers, and preferably having a Shore hardness of approximately 55 to 65, most preferably approximately 60.

9. A clamp block assembly according to claim 1, wherein rotating each clamp block through its different orientations, during assembly, varies a location of each through hole centreline with respect to the clamp.

10. A clamp block assembly according to claim 1, wherein at least two of the clamp blocks are arranged adjacently in a touching relationship.

11. A clamp block assembly according to claim 1, wherein at least two of the clamp blocks are arranged adjacently, and the clamp includes a projection extending between the at least two clamp blocks.

12. A clamp block according to claim 11, wherein the projection and the at least two clamp blocks include co-operating key features to prevent relative movement therebetween.

13. A clamp block assembly according to claim 1, further comprising a mounting bracket for attachment to an adjacent structure.

14. A clamp block assembly according to claim 13, wherein the mounting bracket is integrally formed with the clamp.

15. A clamp block assembly for securing hydraulic pipes, the clamp block assembly comprising a plurality of unitary clamp blocks of deformable material each having a plurality of sides, opposing end faces, and a through hole extending between said opposing end faces of a respective clamp block for receiving a respective pipe, and a clamp adapted to apply a predetermined load around the plurality of clamp blocks, wherein the clamp includes a first clamp part and a second clamp part adapted to be fastened to the first clamp part, and wherein the through hole in each clamp block is offset with respect to a centreline of the respective clamp block so that the through hole is nearer a first side of the plurality of sides of the clamp block than to a second side opposite the first side, wherein each of the plurality of clamp blocks is adapted to sit with respect to the clamp in a plurality of different orientations of rotation about the respective clamp block centreline, and wherein the clamp and the clamp blocks include co-operating key features to prevent relative movement therebetween wherein the co-operating key features include tongue and groove features, and wherein the co-operating key features extend around the periphery of the sides of the clamp block.

16. An aircraft including one or more clamp block assemblies in wherein each claim block assembly is for securing hydraulic pipes, each clamp block assembly comprising a plurality of unitary clamp blocks of deformable material each having a plurality of sides, opposing end faces, and a through hole extending between said opposing end faces of a respective clamp block for receiving a respective pipe, and a clamp adapted to apply a predetermined load around the plurality of clamp blocks, wherein the clamp includes a first clamp part and a second clamp part adapted to be fastened to the first clamp part, and wherein the through hole in each clamp block is offset with respect to a centreline of the respective clamp block so that the through hole is nearer a first side of the plurality of sides of the clamp block than to a second side opposite the first side, wherein each of the plurality of clamp blocks is adapted to sit with respect to the clamp in a plurality of different orientations of rotation about the respective clamp block centreline, and wherein the clamp blocks each include flanges projecting from the end faces and extending beyond the sides of the respective clamp block.

* * * * *